US005130616A

United States Patent [19]

Owen

[11] Patent Number: 5,130,616

[45] Date of Patent: Jul. 14, 1992

[54] MOTOR CONTROL SYSTEM AND COMPONENTS THEREOF

[75] Inventor: Donald W. Owen, Yukon, Okla.

[73] Assignee: Southwest Electric Company, Oklahoma City, Okla.

[21] Appl. No.: 613,116

[22] Filed: Nov. 13, 1990

[51] Int. Cl.[5] .............................................. H02B 3/22

[52] U.S. Cl. ...................................... 318/17; 318/126; 318/138; 361/344; 336/94; 174/17 LF

[58] Field of Search ............... 361/331, 343, 344, 347; 336/94, 90; 174/17 R, 17 LF, 48; 318/132, 138, 17, 727, 780, 786, 787, 126

[56] References Cited

U.S. PATENT DOCUMENTS

| | | | |
|---|---|---|---|
| 742,926 | 11/1903 | Stuart . | |
| 1,320,980 | 11/1919 | Bowman . | |
| 2,713,667 | 7/1955 | Schwennesen | 336/183 |
| 2,791,646 | 5/1957 | Keroes | 179/171 |
| 2,878,441 | 3/1959 | Rogers et al. | 323/44 |
| 3,175,148 | 3/1965 | Swoish et al. | 336/90 |
| 3,284,669 | 11/1966 | Boyd | 317/13 |
| 3,286,153 | 11/1966 | Inose | 321/8 |
| 3,443,157 | 5/1969 | Uptegraff, Jr. | 317/15 |
| 3,675,175 | 7/1972 | Dutton | 336/70 |
| 3,678,428 | 7/1972 | Morris et al. | 336/84 |
| 3,842,186 | 10/1974 | Hall | 174/35 CE |
| 3,891,955 | 6/1975 | Horton, III | 336/205 |
| 3,895,335 | 7/1975 | Manimalethu | 336/183 |
| 3,924,165 | 12/1975 | Otto, Jr. et al. | 318/132 |
| 4,005,341 | 1/1977 | Uptegraff, Jr. et al. | 174/17 R |
| 4,073,000 | 2/1978 | Krejsa | 361/344 |
| 4,160,224 | 7/1979 | Owen | 336/147 |
| 4,223,225 | 9/1980 | Goldman | 318/138 |
| 4,240,917 | 12/1980 | Pearce, Jr. et al. | 336/94 |
| 4,255,734 | 3/1981 | Owen | 336/147 |
| 4,256,932 | 3/1981 | Owen | 200/11 TC |
| 4,300,112 | 11/1981 | Leibinger et al. | 336/180 |
| 4,524,341 | 6/1985 | Owen | 336/147 |

FOREIGN PATENT DOCUMENTS 278636 1/1952 Switzerland .

*Primary Examiner*—William M. Shoop, Jr.
*Assistant Examiner*—John W. Cabeca
*Attorney, Agent, or Firm*—Laney, Dougherty, Hessin & Beavers

[57] ABSTRACT

A motor control system includes a single, multicompartment enclosure mounted on a skid. The enclosure contains a transformer circuit and a motor controller circuit interconnected so that only external connections to a power source and a load are heeded. When the circuits are energized, access to high voltage motor control components and to field replaceable fuses and output selection switches is provented by a double interlocking mechanism which operates in conjunction with energizing and de-energizing the transformer. The transformer of the transformer circuit includes a tertiary winding disposed radially between a primary winding and a secondary winding. The winding filters electrostatically coupled transients. A conventional electrostatic shield is also used so that the transformer is doubly shielded to electrostatic transients. The tertiary winding is connected to one or more capacitors to filter magnetically coupled transients. A current limiting fuse, a load sensing fuse and a primary make/break switch are connected in electrical series to the primary winding. Methods for energizing or operating a motor utilizing the primary switch and the load sensing fuse are also disclosed.

37 Claims, 7 Drawing Sheets

MOTOR CONTROL SYSTEM AND COMPONENTS THEREOF

BACKGROUND OF THE INVENTION

This invention relates generally to a motor control system and it also relates generally to individual components of the system. More particularly, but not by way of limitation, the invention relates to a transformer, a unitary housing, and a double interlock mechanism, all of which are suitable for use in an apparatus for operating a three-phase motor to drive a submersible pump. The present invention is also more particularly directed to a system and method for controlling the energization of a transformer's secondary winding circuit to which a three-phase motor is connected.

Submersible pumps are used, for example, in oil wells at remote locations. Three-phase electric motors are typically used to drive these pumps. Such a motor is rated for a nominal line-to-voltage which must be provided within a specified tolerance for the motor to work. This voltage is typically provided from an electric utility through a transformer and motor controller to provide the suitable voltage and control to operate the motor as desired.

Transformers and motor controllers which have been used in the past have been separate products. That is, the transformer has had its own housing and the motor controller has had its own housing. External connections between the two are needed to have the two work together. Although having two separate units might allow more flexibility in choosing components for a particular application, it has the possible shortcomings of increased price for two rather than one unit and of increased costs for shipping and warehousing. Two separate units would also likely require more space at the location where they are to be used. Therefore, there is the need for a unitary power supply package wherein a transformer and motor controller are interconnected and housed in a single compact unit which can be readily transported to remote locations and easily connected to a source of electricity and a load, such as a three-phase electric motor driving a submersible pump.

To facilitate the use of such a unitary power supply package at a remote location, it should be designed so that a human operator on the ground can have access to at least some internal parts should they need to be repaired or checked in the field. Ground-level access should also be provided so that the operator can readily select a desired output suitable for the load to be energized and readily control a master on/off switch of the power supply package. Access to at least high voltage components should, however, be prevented by automatic interlocks which operate when the master switch is "on."

For safety and economy, the transformer within the power supply package should be designed to provide all needed output and operating voltages and it should also be designed to shield against electrostatically and magnetically coupled transients. Appropriate switching and fusing regardless of the desired output should also be provided.

Such a unitary power supply package should also include a readily transportable housing which accommodates all the other needs mentioned above.

Another feature of the prior transformer and motor controller systems is that the motor controller package includes an air-insulated master power switch, a combined current limiting and load sensing fuse and an electrically operated start-stop contactor switch mechanism connected in series. This places all these components on one side of the transformer.

The disadvantage of the typical master power switch is that it is expensive. It is expensive because it must be constructed to operate safely within its air-insulated environment. Further, the master power switch is typically not used as a complete safety disconnect because it is not constructed to disconnect safely when the motor is energized; rather it is used to isolate the downstream components after the contactor switch mechanism has disconnected the motor. An air-insulated power switch adequate to break the load directly would be even more expensive.

A typical combined current limiting and load sensing fuse used in prior motor controllers is also relatively expensive; therefore, everytime a short-circuit fault or other current overload condition clears the fuse, it must be replaced with a similarly expensive fuse. Another disadvantage of using the fuse in the prior manner is that it cannot be rated for all the transformer outputs which might be available.

In view of these additional disadvantages, there is the need for a system which incorporates a relatively inexpensive, truly emergency safety master power switch which is directly manually operable without the aid of any tools to break a fully loaded circuit. There is also the need for the system to utilize fusing which is relatively inexpensive and which is fully effective to protect the system upstream of a short-circuit fault regardless of a selected transformer output.

SUMMARY OF THE INVENTION

The present invention overcomes the above-noted and other shortcomings of the prior art and meets the aforementioned needs by providing a novel and improved motor control system and components thereof.

The present invention provides a unitary power supply package with an interconnected transformer and motor controller combined in a single housing which can be readily transported to remote locations and easily connected to a source of electricity and load, such as a three-phase motor driving a submersible pump.

The housing is constructed to be placed on the ground during use so that a human operator can readily access function switches and at least some internal components and observe condition indicators. Access to such internal parts and to some function switches is limited by a double interlocking mechanism which is activated whenever the package is operated to provide power to a load.

The transformer of the package is filtered and double shielded to protect against magnetically and electrostatically coupled transients. This is achieved in part by an integral tertiary winding which also provides a suitable output level to operate the motor controller; therefore, separate transformers are not needed in the power supply package. Direct lightning strikes to the secondary circuit of the power supply package should be eliminated because the secondary circuit is completely enclosed in solidly grounded metal surfaces of the housing and armored cable.

A primary load make/break switch and both current limiting and load sensing fuses are connected serially to each phase of the primary of the transformer. The switch and fuses are, in the preferred embodiment, contained within an oil-filled chamber of the housing wherein the transformer windings are also located. Due to its oil-insulated construction the switch is relatively inexpensive, and yet it provides a true emergency safety disconnect because it can be directly manually operated without any tools to break the circuit on the primary side of the transformer even when a load connected to the secondary of the transformer is operating. The fuses are selected and used so that the load sensing fuses, which are more likely to clear than the current limiting fuses, are relatively inexpensive, can be readily replaced and are fully effective to protect the system regardless of the output voltage of the tranformer.

Thus, the present invention has advantages pertaining to safety, economy, compactness and reliability.

The present invention provides a motor control system, comprising: a transformer including a primary winding and a secondary winding; a motor controller connected to the secondary winding of the transformer; and in a preferred embodiment, a single transportable containment means for holding both the transformer and the motor controller.

In a preferred embodiment, the motor control system further comprises a switch, a current-limiting fuse and a load-sensing fuse connected in electrical series to the primary winding. More preferably, the transformer, the switch and the fuses are submerged in oil within the containment means.

In a preferred embodiment, the transformer further includes tertiary winding means for providing an operating voltage to the motor controller and for shielding the secondary winding from transients. More preferably, the tertiary winding means is disposed between the primary and secondary windings, and the transformer further includes capacitance means connected to the tertiary winding means for filtering transients.

In a preferred embodiment, the containment means includes: an internal door and an external cover, both of which are movable between respective open and closed positions; and double interlock means, connected to the aforementioned switch, for retaining the door and the cover in their respective closed positions in response to the switch being operated to its energizing position.

The present invention also includes related methods for controlling the energization or operation of three-phase motors.

Therefore, from the foregoing, it is a general object of the present invention to provide a novel and improved motor control system. It is also a general object of the present invention to provide a novel and improved transformer and a novel and improved transportable containment means. In their preferred embodiments, these components are adapted for use in the inventive motor control system, but they are not limited to such use. Other and further objects, features and advantages of the present invention will be readily apparent to those skilled in the art when the following description of the preferred embodiment is read in conjunction with the accompanying drawings.

DETAILED DESCRIPTION OF PREFERRED EMBODIMENT

Figures 1, 1A:
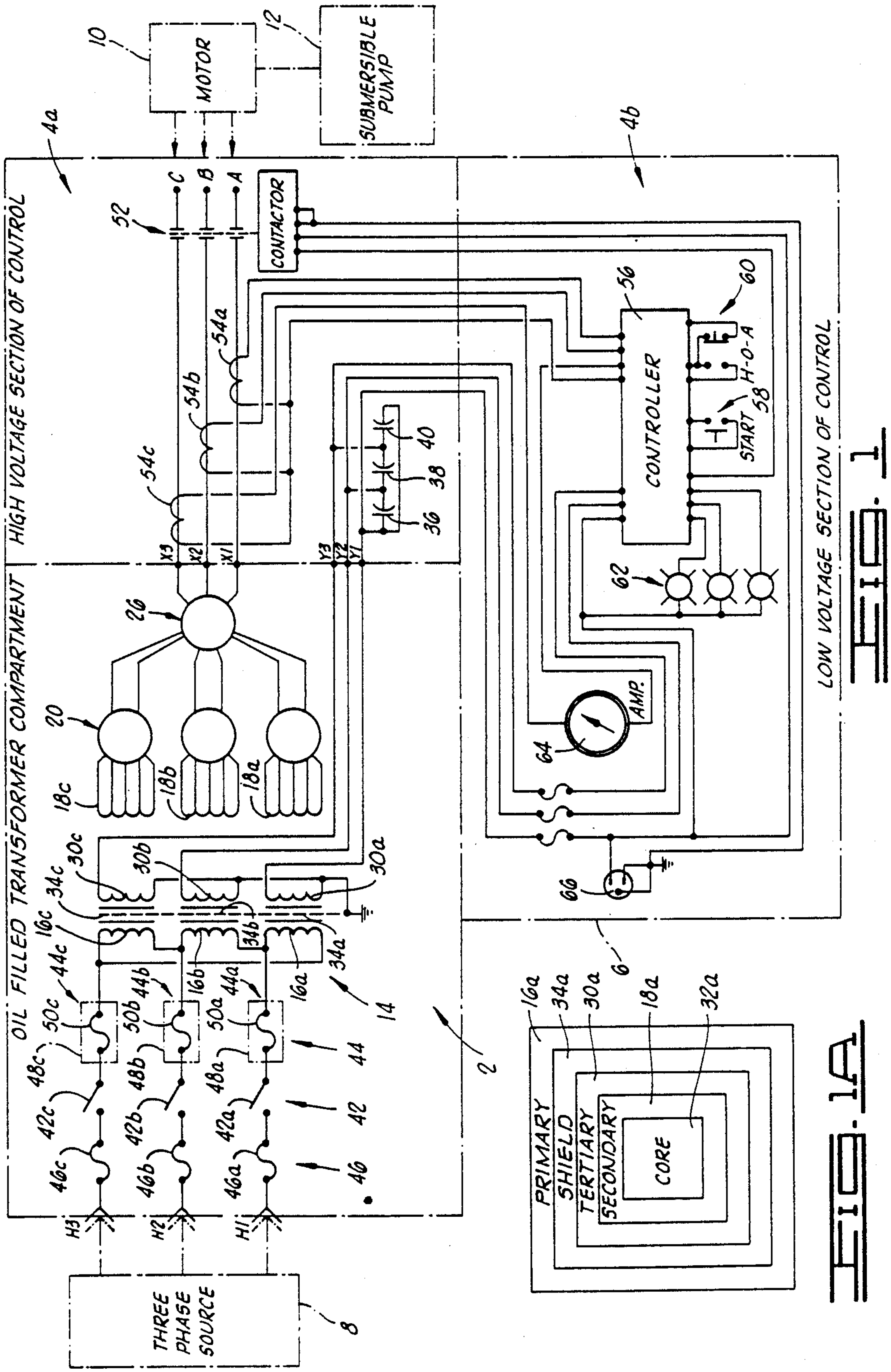
FIG. 1 is a schematic circuit diagram of transformer and motor controller portions of the preferred embodiment of the motor control system of the present invention.
FIG. 1A is a block diagram of a winding configuration for one phase of the preferred embodiment of the transformer within the transformer portion of the motor control system.

The preferred embodiment of the motor control system of the present invention is schematically shown in FIG. 1 as including a transformer circuit 2 and a motor controller circuit comprising a high voltage section 4*a* and a low voltage section 4*b*. These are enclosed within a transportable containment apparatus represented by the dot-dash line 6.

The input of the transformer circuit 2 is adapted to be connected to a suitable power source, such as a three-phase electric utility power source 8. The source 8 typically provides a nominal line-to-line voltage higher than the tolerable line-to-line voltage of a load to be energized with the present invention. In the preferred embodiment described herein the power source 8 provides a substantially constant a.c. (alternating current) voltage from within the range of about 4160 Vac to about 34500 Vac ("substantially constant" encompassing fluctuations from the nominal voltage in a conventional voltage source). This is the input voltage to the transformer circuit 2. The present invention lowers this voltage and controls its application to the load, such as a three-phase motor 10 connected to a submersible pump 12. The windings of the motor 10 are connected to outputs A, B, C of the high voltage section 4*a* of the motor controller for the use illustrated in FIG. 1.

In a contemplated particular application, the motor control system would be placed at the base of a typical riser pole which supports the three-phase power lines of the utility power source 8. Cables from the source 8 would be run down the riser pole and connected to the inputs H1, H2, H3 of the transformer circuit 2. From the outputs A, B, C of the high voltage section 4*a*, cables would be extended to a vented junction box from which cables would extend to connect to the motor 10.

Referring to FIG. 1, the transformer circuit 2 includes a transformer 14. The transformer 14, which is a step-down transformer that provides the only voltage level conversion between the power source 8 and the motor in the illustrated embodiment, includes three primary windings 16*a*, 16*b*, 16*c* and three secondary windings 18*a*, 18*b*, 18*c*. The windings 16, 18 are conventional. The secondary windings 18 are switchably interconnected by a suitable output selection switch 20, such as one used in transformer manufactured by Southwest Electric Company of Oklahoma City. In a particular embodiment, the switch 20 has two exterior handles 22, 24 (FIGS. 2 and 9) mounted on shafts passing through the containment apparatus 6. Rotating the handles 22, 24 selects different taps from the windings 18 for providing different outputs. The handles 22, 24 are manually operated by a person standing on the ground adjacent the motor control apparatus. The switch 20 of the preferred embodiment provides a wide voltage range with all outputs being full kVA rated. The secondary of the transformer 14 is dedicated to a single load, namely the electrical submersible pump motor 10 in the preferred embodiment.

The thus selected portions of the windings 18 are then connected in either a delta or a wye connection by means of a switch 26 which has a handle 28 (FIGS. 2 and 9) mounted on a shaft of the switch 26 passing through the containment apparatus 6. An example of a suitable switch 26 is the RTE Components (Pewaukee, Wis.) 150A externally operated Series Multiple Switch.

Transformer 14 also includes tertiary windings 30*a*, 30*b*, 30*c*. The primary windings 16, the secondary windings 18 and the tertiary windings 30 are all inductively coupled within respective groups to provide a three-phase transformer. Each phase of the preferred embodiment is wound in the manner depicted in FIG. 1A wherein a core leg 32*a* supports the secondary winding 18*a*, the tertiary winding 30*a* and the primary winding 16*a*. It is an important feature of the preferred embodiment that these windings are in the configuration shown in FIG. 1A with the tertiary winding 30*a* radially in between the primary winding 16*a* and the secondary winding 18*a*. A conventional electrostatic shield 34*a* is disposed between the primary winding 16*a* and the tertiary winding 30*a*. Whether the secondary is innermost and the primary outermost as drawn in FIG. 1A, or vice versa, is immaterial; what is important is that the tertiary is radially in between the two and that the electrostatic shield 34 (if used) is radially in between the tertiary and the primary. These same relationships for the tertiary and electrostatic shield should be retained if additional radially disposed windings are used within a winding group on a core leg. Each of the other two phases is similarly constructed as is apparent from FIG. 1. The leg 32*a* and the legs 32*b*, 32*c* (FIG. 2) in the preferred embodiment are part of an overall iron core of a type known in the art.

The tertiary windings 30 provide electrostatic shielding so that the transformer 14 is double-shielded. This is achieved by grounding one end of each of the windings 30*a*, 30*b*, 30*c* as shown in FIG. 1 (alternatively, one tertiary winding could be grounded and the other tertiary windings could be connected to the grounded winding, or to both ground and the grounded winding). This places these common ends in a common ground connection with the conventional electrostatic shield 34. Thus, both the electrostatic shield 34 and the tertiary windings 30 filter electrostatically induced transients; therefore, they need to be disposed between the primary and secondary windings. So that each tertiary 30 can itself be shielded, the respective electrostatic shield 34 needs to be between the primary and the tertiary. A different degree of electrostatic shielding can be obtained by the tertiary windings 30 depending upon the particular winding configuration and axial length. In general, these should be such that the electrostatic induction between the primary windings 16 and the secondary windings 18 is measurably reduced. To maximize the shielding, the axial length of each tertiary winding should be at least as long as the longer of the respective primary winding or secondary winding.

The tertiary windings 30 also filter magnetically induced transients in conjunction with capacitors 36, 38, 40 physically located within the high voltage section 4*a* of the motor controller but electrically connected to the tertiary windings 30. The capacitors 36, 38, 40 shown in FIG. 1 are connected to the ends of the tertiary windings 30 opposite the ends thereof connected to electrical ground. The capacitance preferably is such that the magnitude of transient voltages induced into the tertiary and secondary windings by lightning or switching spikes imposed onto the primary windings is measurably reduced.

A third function of the tertiary windings 30 is to provide control power and metering voltages to the controller section. This is illustrated in FIG. 1 by the connections of the tertiary windings 30 to the low voltage section 4*b* of the motor control circuit.

In a particular embodiment, each of the tertiary windings 30 is implemented by a respective layer of a 3/16 inch wide by 1/16 inch thick rectangular wire spirally wound on the respective electrostatic shield 34 with 3/16 inch spacing between turns. Within each phase of the transformer 14, each of the respective windings and the electrostatic shield is electrically insulated by being wrapped on kraft paper or other suitable insulating substrate known in the art.

The transformer circuit 2 also includes a primary winding circuit which connects the primary windings 16 to the power source 8 when the power source is connected to the high voltage terminals H1, H2, H3. This circuit includes a primary switch 42 used for selectably energizing and de-energizing the transformer 14 and the motor controller from the power source 8. The switch of the preferred embodiment is intended to be operated manually by a person standing on the ground adjacent where the motor control system is located. This operation is direct, i.e., without the aid of any tools, such as a hot stick. The switch 42 should be rated at least for interrupting full load current. The switch 42 is a true emergency safety disconnect switch which can be directly operated by a person to break the current conductive path between a connected power source and the primary windings 16. When the switch 42 makes or completes the current conductive path, the input a.c. voltage is applied to the primary windings 16 so that an induced a.c. output voltage is provided on the secondary windings 18. This causes an output current to flow in a secondary winding circuit connected to the secondary windings 18 if the secondary winding circuit is completed as subsequently described. The resulting input current which flows through the primary side of the transformer 14 is proportional to such output current. The switch 42 is preferably one which is oil-insulated so that it is relatively inexpensive despite being able to break full load current. Any suitable type switch can be used, such as a RTE Components two-position Loadbreak/Loadmake stored energy type switch. This is a three-phase switch with one pole per phase connected in series between the source 8 and a respective primary winding 16 of the transformer 14. The operating mechanism of the switch 42 includes a shaft 43 (FIG. 7A) which extends through the containment apparatus 6. This pass-through of the containment apparatus 6 and the others referred to herein are made fluid-tight by suitable sealing members as would be readily known in the art.

Connected in series with the respective section of the switch 42 are load sensing fuses 44*a*, 44*b*, 44*c* and current limiting fuses 46*a*, 46*b*, 46*c*. The switch 42 and the fuses 44, 46 can be in any order within the series configuration.

Figure 2:
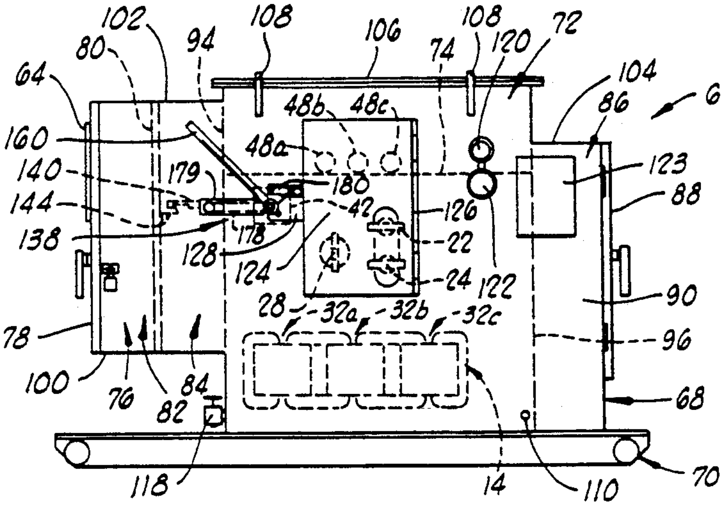
FIG. 2 is a side elevational view of the preferred embodiment of a transportable containment means of the motor control system.
Figure 3:
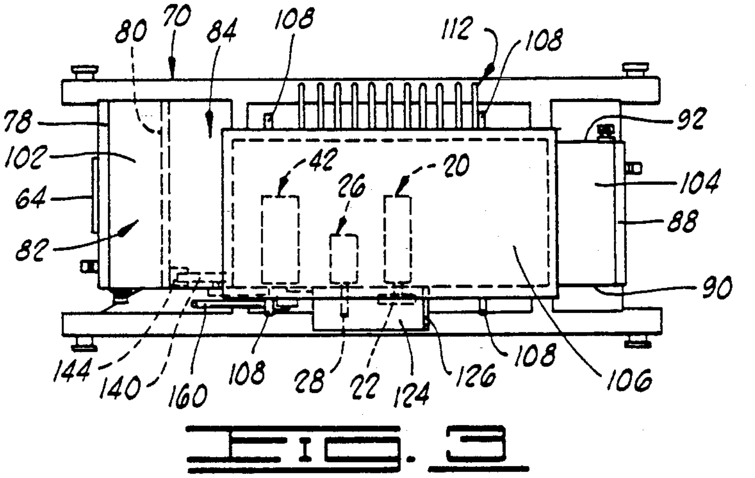
FIG. 3 is a plan view of the transportable containment means.
Figure 9:
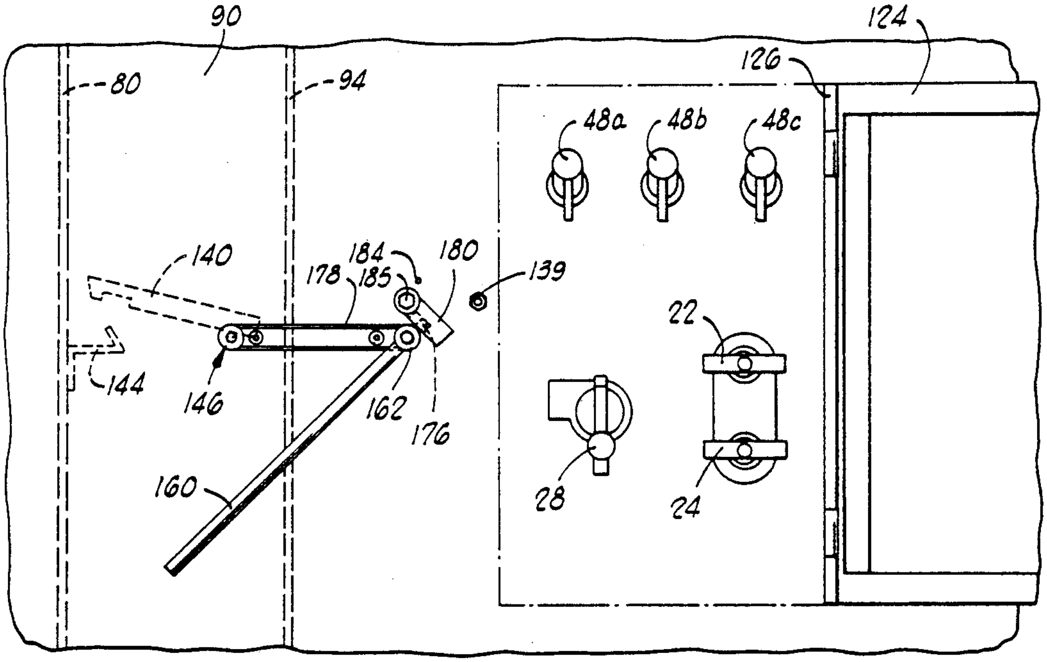
FIG. 9 is an enlarged partial side elevational view showing the double interlocking means in the position shown in FIG. 8, but with a cover moved to an open position and the handle of the double interlocking means locked in its illustrated position.

The fuses 44 are preferably field replaceable, such as by being contained within draw-out mechanisms that penetrate the side of the containment apparatus 6. Each fuse 44 includes a fuse carrier 48 having terminals connected in the electrical series as represented in FIG. 1. The fuse carrier 48 is also connected to the containment apparatus 6 so that an opening of the fuse carrier communicates outside the containment apparatus 6 (FIGS. 2 and 9). A fuse member 50 is releasably connected within the fuse carrier 48 and is replaceable through the opening of the fuse carrier 48. A particular type of fuse which can be used is the RTE Components Bay-O-Net Fuse Assembly with the RTE Components Dual Sensing Bay-O-Net Fuse Link.

The fuses 44 are relatively inexpensive because they provide a lower current interrupting capacity which does not have to withstand as high a current as the fuses 46. The fuses 44 are capable of interrupting a fault current with a magnitude limited solely by the sum of the internal impedance of the power source 8 added to the impedance of the transformer 14 with the secondary windings short-circuited. Stated another way, the fuses 44 stop current flow within the primary winding circuit in response to current flowing therethrough exceeding a predetermined level in response to a short-circuit fault in the secondary windings 18, the secondary winding circuit, or a motor connected to the secondary winding circuit. That is, when a short-circuit fault on the secondary side of the transformer 14 occurs, the magnitude of the output current increases and the magnitude of the input current increases in response. When the increase of the input current reaches a predetermined level, the fuses 44 clear. The predetermined level corresponds to the selected rating of the fuses 44. When the fuses clear, the transformer and the secondary winding circuit are de-energized. This protects the portion of the system upstream of the fault (towards the power source). The fuses 44 clear before the current limiting fuses 46 except when the current exceeds the interrupting capacity of the fuses 44. Such greater fault currents are cleared by the fuses 46.

The current limiting fuses 46 are disposed inside the containment apparatus 6 so that they are not typically field replaceable. The fuses 46 are for clearing the power lines when the transformer 14 fails. More generally, the fuses 46 are capable of interrupting fault currents with a magnitude limited solely by the internal impedance of the power source 8. An example of a suitable fuse 46 is the RTE Components ELSP Current-Limiting Backup Fuse.

Although not shown in the drawing, the transformer circuit can also include suitable conventional arresters to shunt each line to ground in a conventional manner.

The motor controller components of the motor control sections 4*a*, 4*b* are conventional. Typically, the particular motor controller would be specified by the user to coordinate with other equipment. An example of a typical controller is a Vortex brand motor controller.

Referring to FIG. 1, the high voltage section 4*a* includes a vacuum contactor 52 which is electrically operable to connect or disconnect the outputs from the switch 26 to the terminals A, B, C (and the motor 10 when connected thereto). The outputs from the switch 26 are provided to the high voltage section 4*a* through terminals X1, X2, X3. In the preferred embodiment the output includes a substantially constant a.c. voltage within the range of about 460 Vac to about 4160 Vac. There is one contactor pole per phase in series between the secondary of the transformer 14 and the output terminals A, B, C. The contactor 52 is an electrically operated start-stop switch which turns a motor connected to the terminals A, B, C on or off when the output voltage is available at the contactor poles connected to the selected secondary winding sections through the switches 20, 26 and the terminals X1, X2, X3. These connected components comprise the secondary winding circuit by which the motor 10 is connected to the secondary of the transformer 14. The wiring, such as cables, used to connect the motor 10 to the terminals can also be part of the secondary winding circuit. When the contactor 52 is in a conductive state, and the motor 10 is connected, the entire secondary circuit is completed so that if there is output voltage it is applied to the moor and output current flows through the secondary winding, the secondary winding circuit and the motor (when reference is made to a voltage being applied or the like from one point to another, this encompasses any voltage drops across intervening circuitry). When the contactor 52 is in a non-conductive state, the motor 10 is not energized.

The high voltage section 4a also includes three current transformers 54a, 54b, 54c which sense current through the respective phase output line to provide control signals to a solid state logic controller 56 in the low voltage section 4b.

The controller 56 also receives sensing inputs, as well as energizing electricity, from the tertiary windings 30. The controller 56 is operated by start and h-o-a (hand-off-automatic) switches 58, 60, respectively. Indicator lights 62 signal operating conditions in a known manner. A chart recorder/ammeter 64 is also included in the low voltage section 4b, as is a convenience outlet 66.

Although the transformer 14 of the preferred embodiment and its primary side switch 42, with or without fuses 44 or 46, in combination with a secondary-connected motor controller are each novel, the motor controller components of the high voltage section 4a and the low voltage section 4b of the motor control circuit are conventional. It is to be noted, however, that housing all these components of both the transformer circuit 2 and the motor controller circuit 4 within the single containment apparatus is also novel.

Referring to FIGS. 2–6, the transportable containment apparatus 6 of the preferred embodiment includes a single, multicompartment enclosure 68 mounted on a skid 70. The skid 70 provides a base for supporting the housing on the ground. The apparatus 6 can be positioned before or after the external connection cables have been installed at the site where the present invention is to be used.

The enclosure 68 includes a compartment 72 for receiving the components of the transformer circuit 2 shown in FIG. 1. These include the transformer 14 (except for the capacitors 36, 38, 40), the primary switch 42 and the fuses 44, 46. In the preferred embodiment these components are immersed within a volume of liquid, such as a suitable oil known in the art. The surface of the liquid is identified in FIG. 2 by the reference numeral 74. This surface is below the access openings of the fuse carriers 48 of the field replaceable fuses 44. The portion of each fuse carrier 48 into which its replaceable fuse element 50 is connected is, however, below the surface of the liquid, as are the other components of the transformer circuit 2 which are within the compartment 72.

The enclosure 68 includes a compartment 76 in which the capacitors 36, 38, 40 and the components of the motor control sections 4a, 4b are located. At one end of the compartment 76 there is a door 78. There is a door 80 located within the interior of the compartment 76 to divide the compartment 76 into two chambers 82, 84. The components of the low voltage section 4b shown in FIG. 1 are located in the outer chamber 82 and on the door 78, and the capacitors 36, 38, 40 and the components of the high voltage section 4a shown in FIG. 1 are located within the inner chamber 84.

The enclosure 68 includes a compartment 86 containing the high voltage terminals H1, H2, H3 (FIG. 1) to which the power source 8 connects. A door 88 is connected at one end of the compartment 86.

The compartments 72, 76, 86 are defined by side walls 90, 92, end walls 94, 96, and the doors 78, 88. These are also defined by lower plate 100, upper plates 102, 104 and top 106.

Side walls 90, 92 are connected to the base 70 and spaced from each other transversely across the width of the base 70. These side walls can be continuous or defined by individual, but interconnected, plates (such as by welding). They extend perpendicularly from the base 70.

Figure 6:
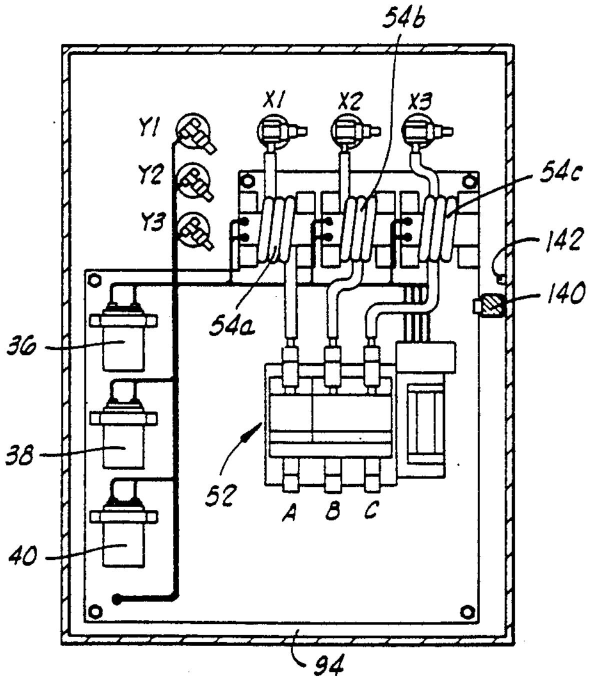
FIG. 6 is an elevational view of an interior wall of the transportable containment means, to which wall components of a high voltage section of the motor controller portion of the motor control system are mounted.

The end walls 94, 96 are connected to the base 70 and to the side walls 90, 92 so that the first compartment 72 includes the end walls 94, 96 and the portions of the side walls 90, 92 in between the end walls 94, 96 and so that the compartment 76 includes the end wall 94 and portions of the side walls 90, 92 extending beyond the end wall 94 away from the compartment 72. Thus, in the preferred embodiment the compartments 72, 76 are adjacent each other with the common intervening wall 94. The compartment 72 includes a floor provided by the top of the base 70. The compartment 72 is covered at the top by the removable top 106 bolted to a flange extending around the respective side walls and end walls. The compartment 76 is completed by the lower plate 100 and the upper plate 102 and the door 78 extending between the side walls 90, 92 at the end of the compartment 76 opposite the end wall 94. The door 80 within the compartment 76 is disposed between the side walls 90, 92 intermediate the end wall 94 and the door 78. Within the inner chamber 84 of the compartment 76, the capacitors 36, 38, 40 and the components of the high voltage section 4a shown in FIG. 1 are mounted on the end wall 94 as shown in FIG. 6.

The compartment 86 is defined by the end wall 96 which is shared in common with the compartment 72. The compartment 86 is also defined by the ends of the side walls 90, 92 extending beyond the end wall 96 away from the compartment 72. These portions of the side walls 90, 92 also extend downward to ground level at the bottom of the base 70., The compartment 86 is further defined by the upper plate 104. The end of the compartment 86 opposite the end wall 96 is closed by the door 88. The bottom of the compartment 86 is left open so that underground cables, for example, can be received into the compartment without passing through the door 88.

Figure 4:
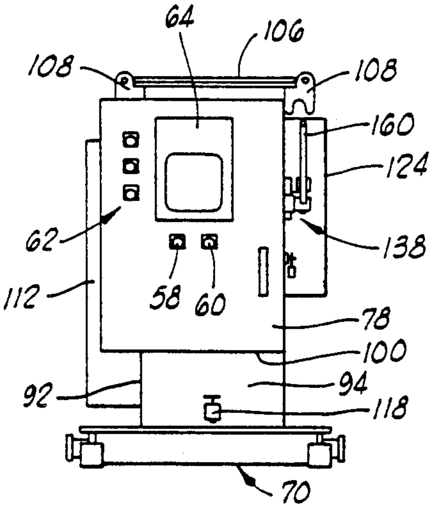
FIG. 4 is an end elevational view of the transportable containment means.
Figure 5:
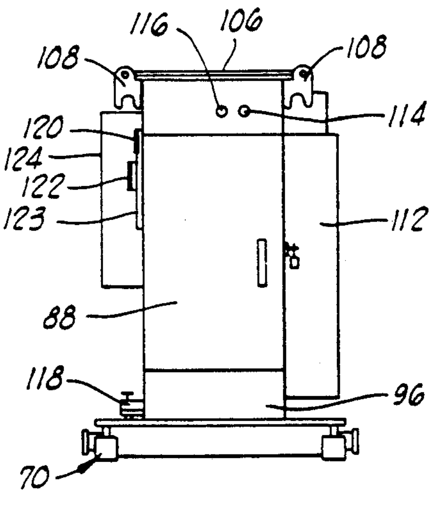
FIG. 5 is another end elevational view of the transportable containment means.

Other features of the containment housing 6 are lifting lugs 108, a grounding connector 110 and cooling panels 112. The cooling panels 112 are vertical flat plates connected to the side wall 92. As shown in FIG. 5, associated with the end wall 96 of the enclosure 68 above the compartment 86 is a pressure relief valve 114 for relieving excessive pressure from within the compartment 72. Also associated with the end wall 96 above the compartment 86 is a fill plug 116 through which the oil or other suitable liquid is flowed into the compartment 72. A drain valve 118 (FIG. 4) allows the liquid to be drained. An oil level gauge 120 and an oil temperature gauge 122 on the side wall 90 monitor these conditions of the liquid inside the compartment 72. A name plate 123 is also mounted on the side wall 90.

Figure 27:
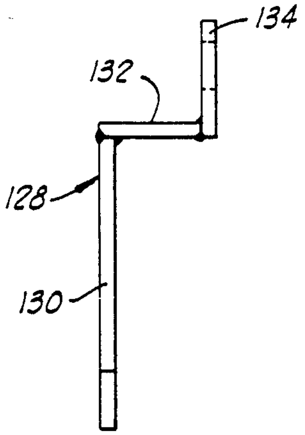
FIG. 27 is another end view of the retaining plate.
Figure 25:
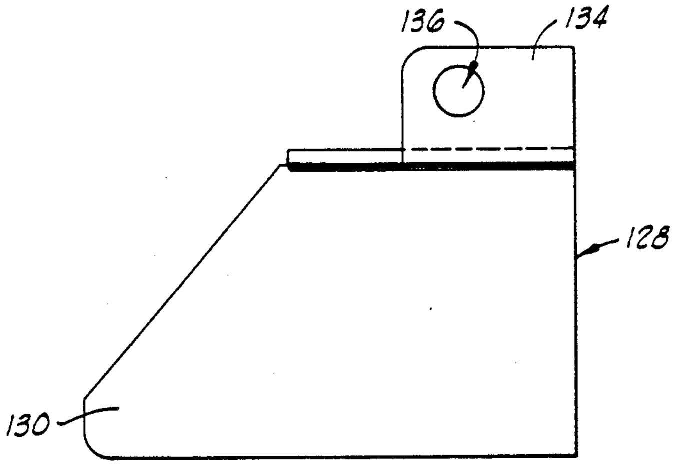
FIG. 25 is a side elevational view of a retaining plate providing a locking tab for the cover of the transportable containment means.
Figure 26:
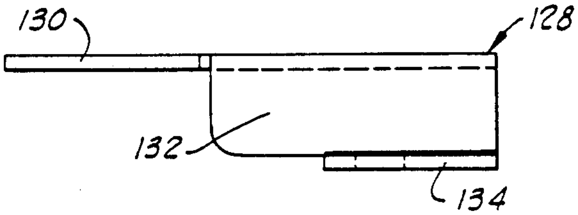
FIG. 26 is an end view of the retaining plate.

Also associated with the side wall 90 is a cover 124. The cover 124 is connected to the enclosure 68 so that the cover 124 is movable between an open position (FIG. 9), wherein the output selection switch handles 22, 24, the delta-wye switch handle 28 and the fuse carriers 48a, 48b, 48c are accessible, and a closed position (FIGS. 2, 7 and 8), wherein these components mounted through ports in the side wall 90 are inaccessible. In the preferred embodiment the cover 124 is hinged to a support plate 126 welded or otherwise suitably connected to the outside of the side wall 90 intermediate the end walls 94, 96. For a use to be described further hereinbelow, the cover 124 includes a retaining plate 12 connected along the edge of the cover 124 opposite the edge connected to the support plate 126. In the preferred embodiment the retaining plate 128 has the construction shown in FIGS. 25–27. This includes a tongue portion 130 at the top of which a support shoulder 132 is connected so that it extends perpendicularly outward from the tongue portion 130. The portion 130 is beveled, notched or otherwise configured to provide both an end to be retained by a retaining member (subsequently described) when the cover 124 is to be locked in its closed position and a space to allow passage of the tongue portion 130 past the retaining member when the cover 124 is permitted to be opened. A tab 134 extends from the support shoulder 132. The tab 134 has a hole 136 for receiving a screw or bolt 137 or other suitable mechanism which can be adjusted inwardly or outwardly through the hole 136 to engage a threaded nut 139 fixed to the side wall 90 for stabilizing the cover 124 in its closed position so that the cover 124 does not rattle. When the cover 124 is in its closed position, the retaining plate 128 is engaged by part of a double interlock mechanism 138. The mechanism 138 both locks the cover 124 in its closed position and locks the door 80 in its closed position in response to the primary switch 42 within the transformer circuit 2 being switched to its energizing position.

The double interlock mechanism 138 generally depicted in FIG. 2 and more clearly shown in FIGS. 7–11 is connected to the primary switch 42. When the switch 42 is manually operated by a person on the ground adjacent the containment apparatus 6, the double interlock mechanism 138 automatically mechanically interlocks or releases the cover 124 and the door 80. Interlock occurs when the switch 42 is switched to its energizing position, and release occurs when the switch 42 is moved to its deenergizing position. When the switch 42 is in its circuit energizing position, the closed cover 124 and the closed door 80 are locked to prohibit access to the fuses 44 and voltage adjusting switches 20, 26 behind the cover 24 and the high voltage section **4*a* components behind the door 80**.

Figure 10:
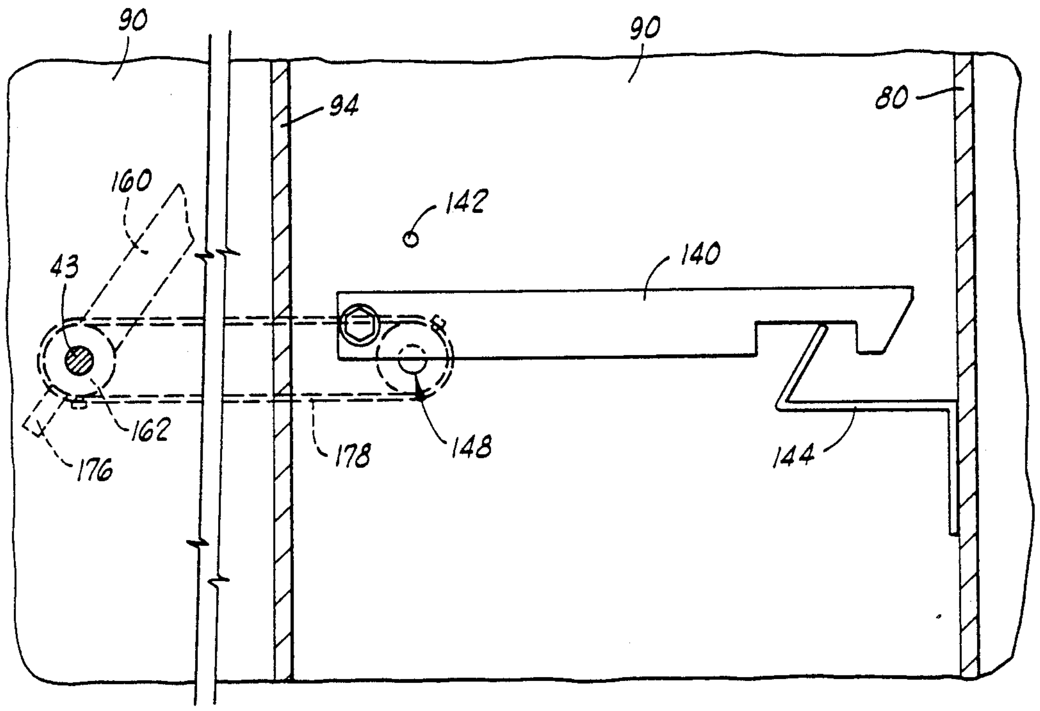
FIG. 10 is an enlarged partial elevational view of the preferred embodiment of a latch of the double interlocking means shown in a latching position.
Figure 11:
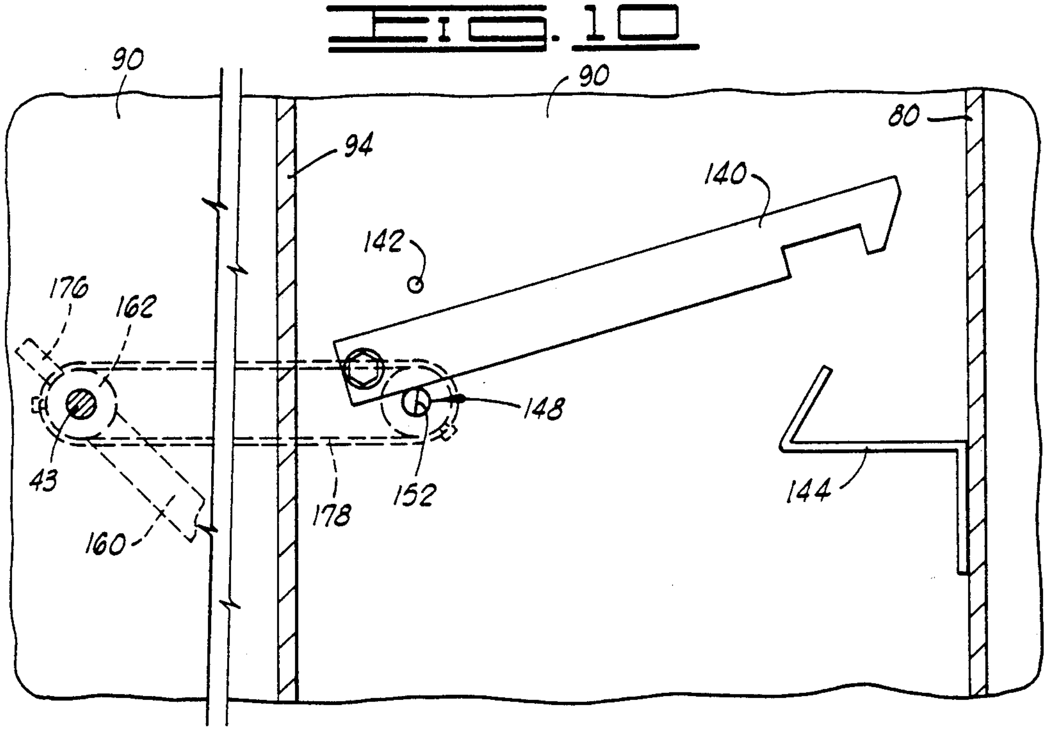
FIG. 11 is an enlarged partial elevational view of the latch shown in an unlatching position.
Figure 12:
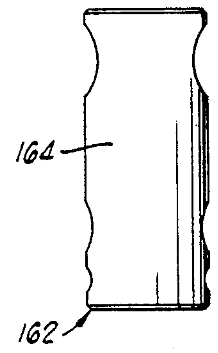
FIG. 12 is a side view of a switch operating connector block of the double interlocking means.
Figure 15:
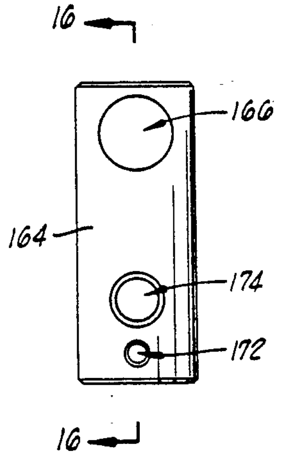
FIG. 15 is another side view of the connector block.
Figure 16:
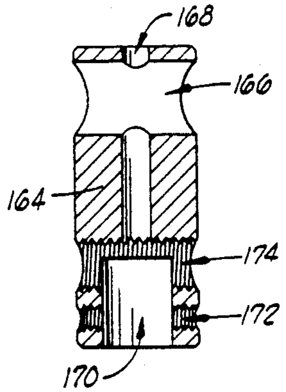
FIG. 16 is a sectional view of the connector block taken along line 16—16 shown in FIG. 15.
Figure 13:
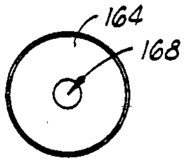
FIG. 13 is an end view of the connector block.
Figure 14:
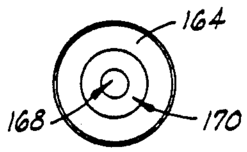
FIG. 14 is an opposite end view of the connector block.
Figure 17:
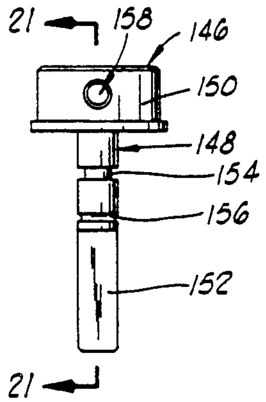
FIG. 17 is a side view of a door latch operating mechanism of the double interlocking means.
Figure 20:
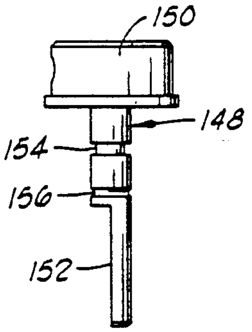
FIG. 20 is another side view of the door latch operating mechanism.
Figure 21:
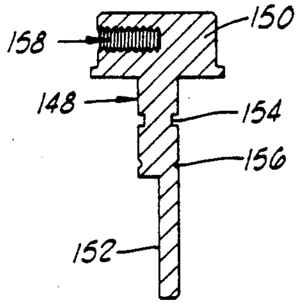
FIG. 21 is a sectional view of the door latch operating mechanism taken along line 21—21 shown in FIG. 17.
Figure 18:
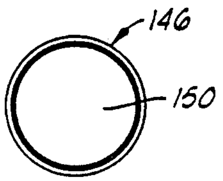
FIG. 18 is an end view of the door latch operating mechanism.
Figure 19:
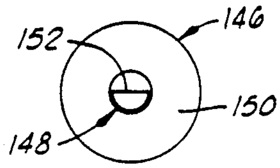
FIG. 19 is an opposite end view of the door latch operating mechanism.

Referring particularly to FIGS. 10 and 11, the double interlock mechanism 138 includes a latch 140 which is movable between a position to engage the door 80 (FIG. 10) and a position to disengage the door 80 (FIG. 11). The latch 140 is pivotally connected at one end on the inside of the side wall 90 within the compartment 76. A pin 142 prevents the latch 140 from pivoting backward over the center of pivotation. The latch 140 engages a catch member 144 connected to the door 80 when the latch 140 is in its door engaging position and the door 80 is closed as illustrated in FIG. 10. In this position, the door 80 is held in its closed position until the latch 140 is moved to its disengaging position shown in FIG. 11. Disengagement can occur in the preferred embodiment either by operation of the double interlock mechanism 138 or by manually lifting up on the latch 140 through a small opening (not shown) provided in the door 80.

The double interlock mechanism 138 also includes manual operating means for concurrently operating the primary switch 42 and the latch 140 so that the latch 140 is in its door-engaging position when the primary switch 42 is operated for energizing the primary winding 16 of the transformer 14 and so that the latch 14 is in its door-disengaging position when the primary switch 42 is operated to its de-energizing position. The manual operating means also concurrently prevents the cover 124 from being moved from its closed position to its open position when the cover 124 is in its closed position and the primary switch 42 is in its energizing position. This operating means is disposed on the exterior of the housing 6 in connection with the side wall 90.

The manual operating means includes operating means for operating the latch 140. The operating means is mounted through the side wall 90 so that there is a portion of the operating means inside the compartment 76 and another portion of the operating means outside the housing 6. The operating means includes a latch movement member 146 rotatably mounted to the side wall 90 in engagement with the latch 140. The preferred embodiment of the latch movement member 146 is shown in FIGS. 17–21. The member 146 shown in these drawings includes a shaft 148 on the exterior end of which is mounted a pulley 150. The interior end of the shaft 148 includes a half cylindrical portion 152 acting as a cam upon which the latch 140 rides as best illustrated in FIGS. 10 and 11. Grooves 154, 156 on the shaft 148 carry a sealing ring and a retaining ring for providing a fluid tight seal where the shaft 148 passes through the side wall 90. The pulley 150 has a threaded cavity 158 defined therein for receiving a screw to retain a drive belt on the pulley 150 as subsequently described hereinbelow.

Figure 7:
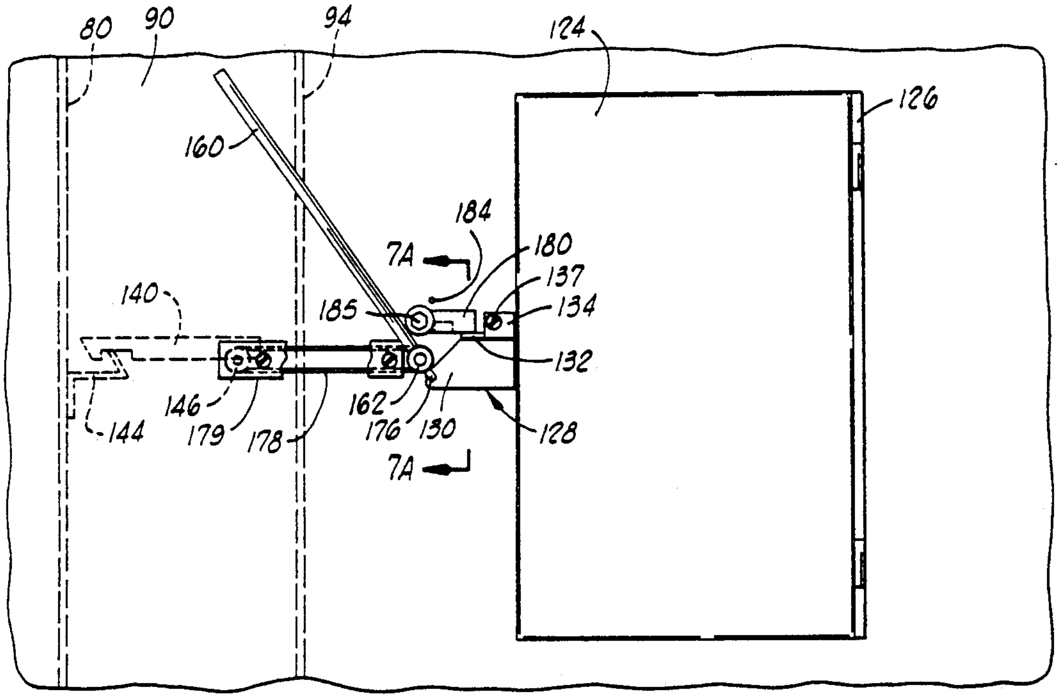
FIG. 7 is an enlarged partial side elevational view showing the preferred embodiment of a double interlocking means of the present invention in one operative position.
Figure 8:
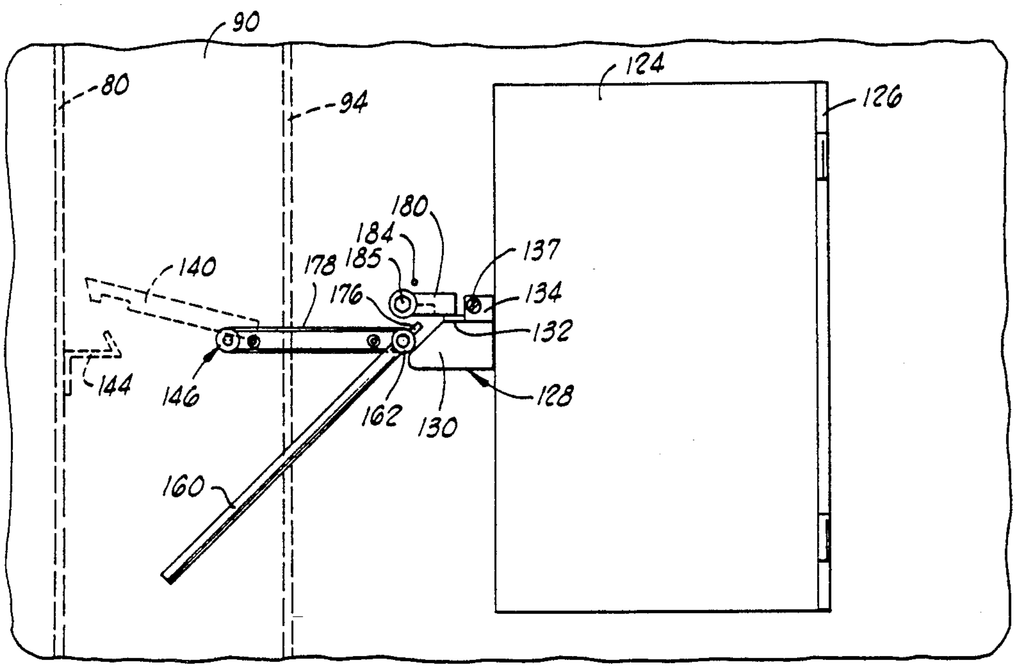
FIG. 8 is an enlarged partial side elevational view of the preferred embodiment of the double interlocking means of the present invention in another operative position.

The manual operating means also includes a handle 160 connected outside the housing 6 to the switch 42. In particular, the handle 160 is connected to the shaft 43 of the switch 42 passing through the side wall 90. This connection is made through a drive means for coupling the handle 160 to the pulley 150 of the latch movement member 146 so that operative movement of the handle 16 actuates the operating means to operate the latch 140. The drive means includes a connector 162 for connecting the handle 160 to the shaft 43 of the switch 42 outside the housing 6 so that the handle 160 is movable between a switch energizing position (FIG. 7) and a switch de-energizing position (FIGS. 8 and 9). The drive means also includes coupling means for coupling the connector 162 and the latch movement member 146 so that the latch movement member 146 moves synchronously with the shaft 43 of the switch 42 in response to operation of the handle 160.

Figure 7A:
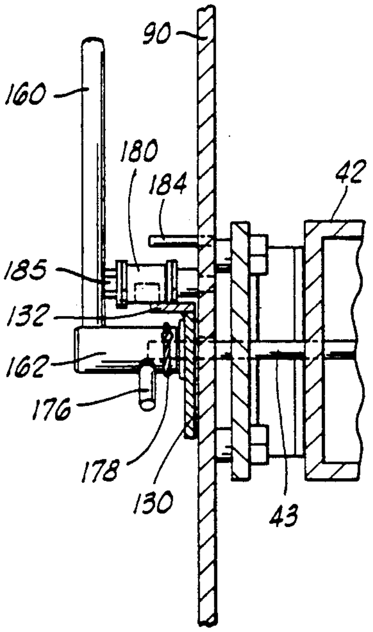
FIG. 7A is an end sectional view taken along lines 7A—7A shown in FIG. 7.

Referring to FIGS. 12–16, the connector 162 includes a cylindrical body 164 having a transverse bore 166 to receive one end of the handle 160. The end of the handle is engaged by a retaining screw or pin (not shown) received through an axial hole 168. Communicating with the hole 168 is an axial cavity 170 which receives the end of the switch shaft 43 protruding outside the housing 6 (FIG. 7A). Set screws through threaded holes 172 secure the connector 162 to the shaft 43. Another transverse threaded hole 174 receives a threaded shaft or pin 176 (FIG. 7A) which defines a retainer means for engaging the retaining plate 128 on the cover 124, thereby retaining the cover 124 in its closed position when the cover 124 is closed and the handle 160 is moved to the position wherein the switch 42 is in its energizing position (the position of handle 160 shown in FIG. 7).

The coupling means of the drive means of the preferred embodiment includes a drive belt 178 extending around and connected to the cylindrical body 164 and the cylindrical pulley 150 as illustrated in FIGS. 2 and 7–9. A guard 179 (FIGS. 2 and 7) can be mounted over the belt 178.

Figure 22:
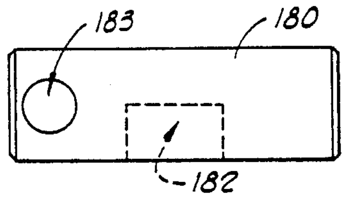
FIG. 22 is a side view of a switch handle locking block of the double interlock means.
Figure 23:
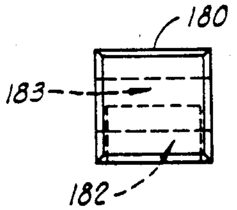
FIG. 23 is an end view of the switch handle locking block.
Figure 24:
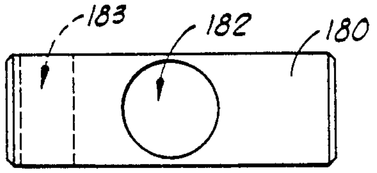
FIG. 24 is another side view of the switch handle locking block.

The double interlock mechanism 138 further includes means for preventing the handle 160 from being moved in response to the cover 124 being moved from its closed position to its open position. As shown in FIGS. 2 and 7–9, this includes a block 180 pivotally connected to the side wall 90 above the connector 162. As more clearly shown in FIGS. 22–24, the block 180 has a hole 182 defined therein. The block 180 is manually movable to a handle enabling position atop the support shoulder 132 of the retaining plate 128 of the cover 124 when the cover is in its closed position as illustrated in FIGS. 2, 7 and 8. The block 180 automatically moves by gravity to a handle disabling position wherein the hole 182 of the block 180 receives the pin 176 in response to the handle 160 being in its switch de-energizing position and the cover being moved to its open position as is shown completed in FIG. 9. A hole 183 (FIGS. 22–24) defined in the block 180 receives a pivot pin 185 (FIGS. 7–9) connecting the block 180 to the side wall 90. A pin 184 (FIGS. 7–9) stops backward movement of the block 180.

In use, the motor control system of the present invention is transported to a location where it is to be connected to a power source and a load, such as the power source 8 and the motor 10 and submersible pump 12 combination. Transportation to and placement at the location are facilitated by the single containment housing 6 which has all the electrical components located and interconnected therein.

Once at the location, conventional power connections are made to the high voltage terminals H1, H2, H3 within the compartment 86, and conventional load connections are made to the terminals A, B, C in the high voltage section **4*a* contained in chamber 84 of compartment 76. Access to the high voltage power input terminals H1, H2, H3 is through the door 88. Access to the normal operational switches 58, 60 and indicators 62, 64 of the motor controller section 4*a* is easy because these are mounted on the door 78 (FIG. 4). Access through the door 80 to the output terminals A, B, C and the other components within the high voltage section 4*a*, however, is limited depending upon the state of the double interlock mechanism 138**.

Prior to operation, the handle 160 of the double interlock mechanism 138 would be in, or moved to, the position shown in FIG. 9. This allows the door 80 to be opened so that connections can be made to the output terminals A, B, C, and it also allows the cover 124 to be opened to permit access to the fuses 44 and the voltage adjusting switch handles 22, 24, 28. When the cover 124 is open, the block 180 drops into the position shown in FIG. 9 to prevent the handle 160 from being moved to the switch 42 energizing position.

Once the connections have been made and the output voltage selected, the door 80 and the cover 124 can be closed. To close the cover 124, the block 180 is manually lifted and placed on the retaining shoulder 132 as illustrated in FIG. 8. The handle 160 is now free to be pivoted clockwise into its switch 42 energizing position shown in FIG. 7. When the handle 160 is moved to this position, the pin 176 is concurrently pivoted clockwise and the latch 140 pivoted counterclockwise (as viewed in the drawings) to their respective positions shown in FIG. 7. The pin 176 then overlies the tongue portion 130 of the retaining plate 128 on the cover 124 and the latch 140 overlies the catch member 144 on the door 80 to retain the cover 124 and the door 80, respectively, in their closed positions. This prevents the cover 124 and the door 80 from being opened while the transformer circuit 2 and the motor controller circuits **4*a*, 4*b* are energized. Even when these circuits are energized, the low voltage section 4*b* is accessible through the door 78 if needed. If access is not needed, the door 78** can be closed and padlocked if desired. Operation of the motor controller circuit, itself, is conventional.

During operation of the transformer 14, the fuses 44 protect against damage resulting from an overload current in the secondary circuit. An overload current can occur in the secondary circuit, which causes an excessive input current to flow on the primary side, because of short-circuit faults in the secondary winding, the motor or the intervening circuitry such as the cables. Such short-circuit faults reduce the secondary side impedance so that, with the output voltage substantially constant, the output current increases. Fuses 46 protect against a complete transformer failure. If one or more of the fuses 44 opens or clears when its current handling capacity is exceeded by the input current, it can be replaced when the transformer 14 is de-energized by the switch 42 and the cover 124 opened. The used fuses are extracted from and new ones inserted into the fuse carriers 48 in a known manner for the type of fuse used. The fuses 46 are not field replaceable without removing the top 106 or otherwise disassembling the enclosure to gain entry into the compartment 72. When the fuses 46 or 48 clear, the input voltage is removed from the primary winding so that the transformer and the other downstream components are de-energized.

During operation of the transformer 14, the electrostatic shields 34 and the tertiary windings 30, being placed between the primary and secondary windings, shield against electrostatically coupled transients. The tertiary windings 30 in combination with the capacitors 36, 38, 40 filter magnetically coupled transients.

During operation of the transformer 14, emergency shut-down can be effected by a person directly manually moving the handle 160 from its switch 42 energizing position (FIG. 7) to its switch 42 de-energizing position (FIG. 8). The handle 160 is directly and safely accessible so that no hot stick or Other tool is needed to actuate the handle.

From the foregoing description of the apparatus shown in FIGS. 1–27 and the operations thereof, it is apparent that the present invention also includes the following methods.

A method of controlling the energization of a motor circuit comprises selectably energizing and de-energizing the motor circuit from a primary winding circuit connected to a primary winding of a transformer. The motor circuit includes a three-phase electrical submersible pump motor and an electrically operated motor start-stop switch connected in a secondary winding circuit to a secondary winding of the transformer. The primary winding circuit includes a switch connected between the primary winding and a power source. The step of selectably energizing and de-energizing particularly includes manually operating the switch of the primary winding circuit without the aid of tools to selectably make and break a current conductive path between the primary winding and the power source. In response to making the current conductive path through unassisted manual operation of the switch in the primary winding circuit, a voltage exists in the secondary winding circuit for energizing the motor through the motor start-stop switch connected in the secondary winding circuit. In response to breaking the current conductive path through unassisted manual operation of the switch in the primary winding circuit, no voltage exists in the secondary winding circuit for energizing the motor through the motor start-stop switch connected in the secondary winding circuit.

For the following defined method, reference is again specifically made to a three-phase electrical submersible pump motor. The motor is connected by electrical cables and an electrically operated contactor of a secondary winding circuit to a secondary winding of a transformer. The transformer also includes a primary winding connected by a primary winding circuit to a substantially constant a.c. voltage power source. A method of operating this motor comprises applying the voltage of the power source across the primary winding of the transformer so that a substantially constant a.c. output voltage is induced across the secondary winding and an output current flows through the secondary winding, cables, contactor and motor in response to the contactor in the secondary winding circuit being in a conductive state. The method also includes conducting input current through the primary winding circuit, including through a fuse thereof connected between the power source and the primary winding, the input current having a magnitude proportional to the output current. The method further includes de-energizing the transformer and the secondary winding circuit in response to a short-circuit fault in the secondary winding or the secondary winding circuit. This is achieved by clearing the fuse in the primary winding circuit in response to the magnitude of the input current reaching a predetermined level as a result of the magnitude of the output current increasing to a level resulting from a shortcircuit fault in the secondary winding or the secondary winding circuit.

A method of operating a three-phase motor connected by a secondary winding circuit to a secondary winding of a transformer, comprises energizing the motor and protecting the primary winding of the transformer from damage by an excessive input current resulting from an excessive output current caused to flow as a result of a fault in the secondary winding or the secondary winding circuit or the motor reducing the secondary side impedance to a short-circuit state and protecting any portion of the secondary winding and the secondary winding circuit which is upstream of the fault from the excessive output current. Energizing the motor includes applying a substantially constant a.c. input voltage to the primary winding of the transformer so that a substantially constant a.c. output voltage is induced across the secondary winding. Energizing the motor also includes closing an electrically operated motor start-stop switch connected in the secondary winding circuit in between the secondary winding and the motor so that the output voltage is applied to the motor and an output current flows through the secondary winding, the secondary winding circuit and the motor. The output current is responsive to the impedance of the secondary winding, the secondary winding circuit and the motor. Energizing the motor further includes conducting an input current through the primary winding, which input current has a magnitude responsive to the output current. Protecting the circuits upstream of the fault includes automatically clearing a fuse connected to the primary winding. This clearing occurs in response to the input current exceeding a predetermined magnitude. Upon clearing, the input voltage is removed from the primary winding.

Thus, the present invention is well adapted to carry out the objects and attain the ends and advantages mentioned above as well as those inherent therein. While a preferred embodiment of the invention has been described for the purpose of this disclosure, changes in the construction and arrangement of parts can be made by those skilled in the art, which changes are encompassed within the spirit of this invention as defined by the appended claims.

What is claimed is:

1. A motor control system, comprising:

power connection input terminals for connecting to an external electric utility power source providing alternating current voltage of at least about 4160 Vac;

load connection output terminals for connecting to an external motor;

a transformer for conducting all the electric power consumed by said motor control system and the external motor, said transformer including:

a primary winding connected to said power connection input terminals so that said primary winding is adapted for direct connection via said power connection input terminals to the electric utility power source; and a secondary winding adapted to supply power directly to the external motor via said load connection output terminals;

a motor controller for switchably connecting said secondary winding to said load connection output terminals, said motor controller including switch terminals connected to said secondary winding and said load connection output terminals; and a single transportable containment means for holding said power connection input terminals, said load connection output terminals, said transformer and said motor controller.

2. A motor control system as defined in claim 1, further comprising a switch, a current-limiting fuse and a load-sensing fuse connected in electrical series to said primary winding.

3. A motor control system as defined in claim 2, wherein said transformer, said switch and said fuses are submerged in oil within said containment means.

4. A motor control system as defined in claim 1, wherein said transformer further includes tertiary winding means for providing an operating voltage to said motor controller and for shielding said secondary winding from transients.

5. A motor control system as defined in claim 4, wherein said tertiary winding means is disposed between said primary and secondary windings.

6. A motor control system as defined in claim 4, wherein said transformer further includes capacitance means connected to said tertiary winding means for filtering transients.

7. A motor control system, comprising:

a transformer including a primary winding and a secondary winding;

a motor controller connected to said secondary winding of said transformer;

a single transportable containment means for holding both said transformer and said motor controller;

a switch connected to said transformer, said switch operable between an energizing position and a de-energizing position; and wherein said containment means includes:

an internal door and an external cover, both said door and said cover movable between respective open and closed positions; and double interlock means, connected to said switch, for retaining said door and said cover in said respective closed positions in response to said switch being operated to said energizing position.

8. A system for operating a three-phase motor having a nominal line-to-line voltage rating, comprising:

three-phase transformer means for converting a line-to-line voltage of a three-phase power source to a level compatible with the nominal line-to-line voltage rating of the motor, said transformer means including a three-phase primary and three-phase secondary;

primary switch means, connected to said three-phase primary of said transformer means, for selectably energizing or de-energizing said three-phase primary from the three-phase power source in response to direct manual operation of said primary switch means by a person adjacent said primary switch means when said primary switch means is connected to the three-phase power source;

motor control means, connected to said three-phase secondary of said transformer means, for controlling the application of a three-phase output from said three-phase secondary to the three-phase motor; and a housing having said transformer means, said primary switch means and said motor control means disposed therein.

9. A system as defined in claim 8, wherein the motor is an electrical submersible pump motor and said transformer means includes a three-phase step-down transformer providing the only voltage level conversion between the power source and said motor control means.

10. A system as defined in claim 8, wherein said housing includes a first compartment and a second compartment, said first compartment having said transformer means and said primary switch means disposed therein within a volume of liquid contained in said first compartment, and said second compartment having said motor control means disposed therein.

11. A system as defined in claim 10, wherein:

said motor control means includes a high voltage section and a low voltage section; and said second compartment includes a first chamber and a second chamber, said first chamber having said high voltage section of said motor control means disposed therein and said second chamber having said low voltage section of said motor control means disposed therein.

12. A system as defined in claim 11, wherein:

said housing further includes a door disposed between said first and second chambers of said second compartment; and said apparatus further comprises:

a latch disposed in said first chamber so that said latch is movable between a first position, wherein said latch is positioned to engage said door, and a second position, wherein said latch is positioned to disengage said door; and manual operating means, disposed on the exterior of said housing, for concurrently operating said primary switch means and said latch so that said latch is in said first position in response to said primary switch means being operated by said manual operating means to energize said three-phase primary and so that said latch is in said second position in response to said primary switch means being operated by said manual operating means to de-energize said three-phase primary.

13. A system as defined in claim 12, wherein:

said transformer means further includes output selection switch means, connected to said three-phase secondary and having at least a part thereof mounted on the exterior of said housing, for selectably switching sections of said secondary into different configurations for providing different outputs in response to manual operation of said output selection switch means by a person adjacent said output selection switch means;

said system further comprises a cover connected to said housing so that said cover is movable between an open position, wherein said exterior part of said output selection switch means is accessible, and a closed position, wherein said exterior part of said output selection switch means is inaccessible; and said manual operating means includes means for preventing said cover from being moved from said closed position to said open position when said cover is in said closed position and said primary switch means has been operated by said manual operating means for energizing said three-phase primary.

14. A system as defined in claim 13, further comprising:

a first set of three fuses disposed within said housing, each of said three fuses of said first set connected in electrical series with said primary switch means for a respective phase of the three-phase power source; and a second set of three fuses disposed within said housing but accessible for replacement through said housing when said cover is in its open position, each of said three fuses of said second set connected in electrical series with said primary switch means and the respective fuse of said first set for a respective phase.

15. A system as defined in claim 13, wherein said transformer means further includes:

three-phase tertiary winding means, disposed between said three-phase primary and said three-phase secondary, for filtering electrostatically induced transients; and capacitance means, connected to said three-phase tertiary winding means, for providing capacitance so that magnetically induced transients are filtered by said connected three-phase tertiary winding means and said capacitance means.

16. A system as defined in claim 13, wherein said transformer means further includes:

three subassemblies connected together, each of said subassemblies including:

a wound primary winding adapted to be connected to the three-phase power source;

an electrostatic shield electrically insulated from and wound adjacent said primary winding;

a tertiary winding wound adjacent said electrostatic shield; and a secondary winding electrically insulated from and wound adjacent said tertiary winding; and at least two capacitors connected to said tertiary windings of said subassemblies.

17. A system as defined in claim 8, further comprising three fuses, each of said fuses connected in electrical series with said primary switch means for a respective phase of the three-phase power source.

18. A system as defined in claim 8, further comprising:

a first set of three fuses, each of said fuses of said first set connected in electrical series with said primary switch means for a respective phase of the three-phase power source and each of said fuses of said first set providing means for interrupting fault current when the fault current has a magnitude limited solely by the internal impedance of the three-phase power source; and a second set of three fuses, each of said fuses of said second set connected in electrical series with said primary switch means and the respective fuse of said first set for a respective phase and each of said fuses of said second set providing means for interrupting fault current when the fault current has a magnitude limited solely by the sum of the internal impedance of the three-phase power source and the impedance of said transformer with said three-phase secondary short-circuited.

19. An apparatus for operating a motor, comprising:

a housing including a first compartment and a second compartment and further including a door disposed in said second compartment;

a transformer disposed in said first compartment;

a switch disposed in said first compartment and connected to said transformer, said switch switchable between an energizing position and a de-energizing position;

a motor controller disposed in said second compartment, wherein at least a portion of said motor controller is disposed in said second compartment behind said door;

a cover connected to said housing so that said cover is movable between a closed position and an open position; and double interlock means for locking said door in its closed position and for locking said cover in its closed position in response to said switch being switched to said energizing position.

20. An apparatus as defined in claim 19, wherein said double interlock means includes;

first engagement means for engaging said door to hold said door in its closed position, said first engagement means mounted inside said second compartment;

operating means for operating said first engagement means, said operating means mounted through said housing so that there is a portion of said operating means inside said second compartment and so that there is another portion of said operating means on the outside of said housing;

a handle connected outside said housing to said switch;

drive means for couplings said handle and said another portion of said first engagement means so that operative movement of said handle activates said operating means to operate said first engagement means; and second engagement means, connected to said handle, for engaging said cover to hold said cover in its closed position.

21. An apparatus as defined in claim 19, wherein:

said switch includes a shaft extending through a side wall of said housing;

said double interlock means includes;

a latch for said door, said latch pivotally connected to said housing inside said second compartment;

a latch movement member rotatably mounted through said housing in engagement with said latch;

a handle;

connector means for connecting said handle to said shaft outside said housing so that said handle is movable between a switch energizing position and a switch de-energizing position;

coupling means for coupling said connector means and said latch movement member so that said latch movement member moves synchronously with said shaft of said switch in response to operation of said handle; and retainer means, connected to said connector means, for retaining said cover in its closed position in response to said handle being moved to said switch energizing position.

22. An apparatus as defined in claim 21, wherein said double interlock means further includes means, responsive to said cover being moved from its closed position to its open position, for preventing said handle from being moved.

23. An apparatus as defined in claim 22, wherein:

said retainer means includes a pin connected to said connector means;

said cover includes a retaining plate engaged by said pin when said cover is in its closed position and said handle is in its switch energizing position; and said means for preventing includes a block pivotally connected to said housing above said connector means, said block having a hole defined therein and said block manually movable to a handle enabling position atop said retaining plate when said cover is in its closed position, and said block automatically movable to a handle disabling position wherein said hole of said block receives said pin in response to said handle being in its switch de-energizing position and said cover being moved to its open position.

24. An apparatus for operating a three-phase motor, comprising:

a housing including a first compartment and a second compartment and further including a door disposed in said second compartment, said housing also including a base for supporting said housing on the ground;

a transformer, said transformer including a primary winding and a secondary winding disposed in said first compartment;

a switch, a first fuse and a second fuse connected in electrical series to said primary winding and disposed within said first compartment, said second fuse including:

a fuse carrier connected in said electrical series and connected to said housing so that an opening of said fuse carrier communicates outside said housing; and a fuse member releasably connected in said electrical series within said fuse carrier and replaceable through said opening of said fuse carrier;

a motor controller having at least a portion thereof disposed in said second compartment behind said door, said motor controller connected to said secondary winding of said transformer;

a cover connected to said housing to prevent access to said second fuse when said cover is in a closed position; and double interlock means for locking said door in its closed position and for locking said cover in its closed position in response to said switch being switched to a primary winding energizing position.

25. An apparatus as defined in claim 24, wherein:

said apparatus further comprises a volume of oil within said first compartment covering said primary and secondary windings, said switch, said first fuse and at least a portion of said second fuse; and said switch connects through said housing to said double interlock means.

26. An apparatus as defined in claim 25, wherein said transformer further comprises:

a tertiary winding disposed between said primary and secondary windings; and a capacitor, disposed in said second compartment and connected to said tertiary winding.

27. An apparatus as defined in claim 26, wherein said transformer further comprises an electrostatic shield disposed between said primary winding and said tertiary winding, said electrostatic shield having a common connection with said tertiary winding.

28. A system for operating a three-phase motor, comprising:

a transformer including a three-phase primary winding and a three-phase secondary winding;

primary winding circuit means for connecting to a three-phase power source and for controlling whether current flows through said three-phase primary winding from a connected three-phase power source, said primary winding circuit means including switch means, responsive to direct manual operation by a person adjacent said switch means, for selectably completing or breaking a current conductive path between said primary winding and a connected power source, said switch means adapted for breaking the current conductive path even when current is flowing through said secondary winding and a three-phase motor connected thereto; and secondary winding circuit means for connecting the motor to said secondary winding, said secondary winding circuit means including motor control means, connected to said secondary winding, for controlling the application of a three-phase output from said secondary winding to a connected three-phase motor.

29. A system as defined in claim 28, wherein said primary winding circuit means further includes fuse means, connected in electrical series with said switch means, for stopping current flow within said primary winding circuit means in response to current in said primary winding circuit means exceeding a predetermined level in response to a short-circuit fault in said secondary winding or said secondary winding circuit or a motor connected thereto.

30. A system for operating a three-phase electrical submersible pump motor, comprising:

a transformer, including:

primary winding means for receiving an input voltage from a power source, said input voltage being within the range of about 4160 Vac to about 34500 Vac; and secondary winding means, responsive to said input voltage received by said primary winding means, for providing an output voltage dedicated for energizing a single three-phase electrical submersible pump motor, said output voltage being within the range of about 460 Vac to about 4160 Vac;

safety disconnect switch means, responsive to unassisted manual operation by a human operator adjacent said switch means, for selectably making or breaking a circuit between said primary winding means and a connected power source; and motor control means, connected to said secondary winding means, for controlling the application of said output voltage to the three-phase electrical submersible pump motor.

31. A system as defined in claim 30, further comprising fuse means, connected in electrical series with said switch means, for stopping current flow in said primary winding means in response to a current through said fuse means exceeding a predetermined level in response to a short-circuit fault on the secondary side of said transformer.

32. A system for controlling the energization of a motor circuit, comprising:

a transformer including a primary winding and a secondary winding;

a secondary winding circuit connected to said secondary winding, said secondary winding circuit including:

an electrically operated motor start-stop switch connected to said secondary winding; and means for connecting said start-stop switch to a three-phase electrical submersible pump motor; and a primary winding circuit connected to said primary winding, said primary winding circuit including means for selectably energizing and de-energizing the secondary winding and the secondary winding circuit from the primary winding circuit, said means including switch means for selectably connecting the primary winding to a power source and disconnecting the primary winding from the power source in response to manual operation of said switch means without the aid of tools to selectably make and break a current conductive path between the primary winding and the power source so that in response to making the current conductive path through unassisted manual operation of said switch means in the primary winding circuit a voltage exists in the secondary winding circuit for energizing the motor through the motor start-stop switch connected in the secondary winding circuit and in response to breaking the current conductive path through unassisted manual operation of said switch means in the primary winding circuit no voltage exists in the secondary winding circuit for energizing the motor through the motor start-stop switch connected in the secondary winding circuit.

33. A system for operating a three-phase electrical submersible pump motor, comprising:
 a transformer including a primary winding and a secondary winding;
 a secondary winding circuit including an electrically operated contactor connected to said secondary winding; and
 a primary winding circuit connected to said primary winding, said primary winding circuit including means for applying the voltage of a substantially constant a.c. voltage power source across said primary winding of said transformer so that a substantially constant a.c. output voltage is induced across said secondary winding and an output current flows through said secondary winding, contactor and a connected three-phase electrical submersible pump motor in response to said contactor in said secondary winding circuit being in a conductive state, and for conducting input current through said primary winding circuit, said input current having a magnitude proportional to said output current; said means including means for de-energizing said transformer and said secondary winding circuit in response to a short-circuit fault in said secondary winding or said secondary winding circuit, said means for de-energizing including fuse means for clearing said primary winding circuit in response to the magnitude of said input current reaching a predetermined level as a result of the magnitude of said output current increasing to a level resulting from a short-circuit fault in said secondary winding or said secondary winding circuit.

34. A system for operating a three-phase motor, comprising:
 a transformer including a primary winding and a secondary winding;
 means for applying a substantially constant a.c. input voltage to said primary winding so that a substantially constant a.c. output voltage is induced across said secondary winding and for conducting an input current through said primary winding;
 a secondary winding circuit for connecting the motor to said secondary winding, said secondary winding circuit including an electrically operated motor start-stop switch connected to said secondary winding so that said output voltage is applied to a connected motor and an output current flows through said secondary winding, said secondary winding circuit and the connected motor, said output current responsive to the impedance of said secondary winding, said secondary winding circuit and the connected motor, and said input current having a magnitude responsive to said output current; and
 wherein said means for applying includes means for protecting said primary winding from damage by an excessive input current resulting from an excessive output current caused to flow as a result of a fault in said secondary winding or said secondary winding circuit or the connected motor reducing the impedance to a short-circuit state and for protecting any portion of said secondary winding and said secondary winding circuit which is upstream of said fault from said excessive output current, said means for protecting including a fuse connected to the primary winding for clearing in response to said input current exceeding a predetermined magnitude so that said input voltage is removed from said primary winding.

35. A method of controlling the energization of a motor circuit, comprising selectably energizing and de-energizing the motor circuit from a primary winding circuit connected to a primary winding of a transformer, wherein the motor circuit includes a three-phase electrical submersible pump motor and an electrically operated motor start-stop switch connected in a secondary winding circuit to a secondary winding of the transformer and wherein the primary winding circuit includes a switch connected between the primary winding and a power source, said selectably energizing and de-energizing including manually operating the switch of the primary winding circuit without the aid of tools to selectably make and break a current conductive path between the primary winding and the power source so that in response to making the current conductive path through unassisted manual operation of the switch in the primary winding circuit a voltage exists in the secondary winding circuit for energizing the motor through the motor start-stop switch connected in the secondary winding circuit and in response to breaking the current conductive path through unassisted manual operation of the switch in the primary winding circuit no voltage exists in the secondary winding circuit for energizing the motor through the motor start-stop switch connected in the secondary winding circuit.

36. A method of operating a three-phase electrical submersible pump motor connected by electrical cables and an electrically operated contactor of a secondary winding circuit to a secondary winding of a transformer, which transformer also includes a primary winding connected by a primary winding circuit to a substantially constant a.c. voltage power source, said method comprising:
 applying the voltage of the power source across the primary winding of the transformer so that a substantially constant a.c. output voltage is induced across the secondary winding and an output current flows through the secondary winding, cables, contactor and motor in response to the contactor in the secondary winding circuit being in a conductive state;
 conducting input current through the primary winding circuit, including through a fuse thereof connected between the power source and the primary winding, the input current having a magnitude proportional to the output current; and
 de-energizing the transformer and the secondary winding circuit in response to a short-circuit fault in the secondary winding or the secondary winding circuit, including clearing the fuse in the primary winding circuit in response to the magnitude of the input current reaching a predetermined level as a result of the magnitude of the output current increasing to a level resulting from a short-circuit fault in the secondary winding or the secondary winding circuit.

37. A method of operating a three-phase motor connected by a winding circuit to a secondary winding of a transformer, comprising:
 energizing the motor, including:
  applying a substantially constant a.c. input voltage to a primary winding of the transformer so that a substantially constant a.c. output voltage is induced across the secondary winding;

closing an electrically operated motor start-stop switch connected in the secondary winding circuit in between the secondary winding and the motor so that the output voltage is applied to the motor and an output current flows through the secondary winding, the secondary winding circuit and the motor, the output current responsive to the impedance of the secondary winding, the secondary winding circuit and the motor; and conducting an input current through the primary winding, the input current having a magnitude responsive to the output current; and protecting the primary winding from damage by an excessive input current resulting from an excessive output current caused to flow as a result of a fault in the secondary winding or the secondary winding circuit or the motor reducing the impedance to a short-circuit state and protecting any portion of the secondary winding and the secondary winding circuit which is upstream of the fault from the excessive output current, including automatically clearing a fuse connected to the primary winding in response to the input current exceeding a predetermined magnitude so that the input voltage is removed from the primary winding.

* * * * *

UNITED STATES PATENT AND TRADEMARK OFFICE
CERTIFICATE OF CORRECTION

PATENT NO. : 5,130,616

DATED : July 14, 1992

INVENTOR(S) : Donald W. Owen

It is certified that error appears in the above—identified patent and that said Letters Patent is hereby corrected as shown below:

Column 5, line 48, "transformer" should be --transformers--.

Column 9, line 30, after "apparatus", insert --6--.

Column 12, line 3, "14" (2nd occurrence) should be --140--.

Column 14, line 48, "Other" should be --other--.

Signed and Sealed this

Thirty-first Day of August, 1993

Attest:

BRUCE LEHMAN

Attesting Officer

Commissioner of Patents and Trademarks